United States Patent
Xia et al.

(10) Patent No.: US 11,719,571 B2
(45) Date of Patent: Aug. 8, 2023

(54) SYSTEMS AND METHODS FOR IDENTIFYING THREAT DISTANCE TO FIBER OPTIC CABLE

(71) Applicant: Verizon Patent and Licensing Inc., Basking Ridge, NJ (US)

(72) Inventors: Tiejun J. Xia, Richardson, TX (US); Glenn A. Wellbrock, Wylie, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 236 days.

(21) Appl. No.: 17/101,886

(22) Filed: Nov. 23, 2020

(65) Prior Publication Data
US 2022/0163376 A1    May 26, 2022

(51) Int. Cl.
*H04B 10/071* (2013.01)
*G01H 9/00* (2006.01)
*G01D 5/353* (2006.01)
*G01M 11/00* (2006.01)

(52) U.S. Cl.
CPC ......... *G01H 9/004* (2013.01); *G01D 5/35361* (2013.01); *G01M 11/30* (2013.01); *H04B 10/071* (2013.01)

(58) Field of Classification Search
CPC .............. G01M 11/30; G01D 5/35358; G01D 5/35361; H04B 10/071
See application file for complete search history.

(56) References Cited

PUBLICATIONS

Aktas et al., Deep Learning Based Multi-Threat Classification for Phase-OTDR Fiber Optic Distributed Acoustic Sensing Applications, Apr. 27, 2017, Proc. SPIE 10208, Fiber Optic Sensors and Applications XIV, 19 pp. (Year: 2017).*

* cited by examiner

*Primary Examiner* — Toan M Le

(57) ABSTRACT

In some implementations, a device may obtain responsivity data for segments of a fiber optic cable. The device may receive, from a sensor device, vibration data associated with the fiber optic cable, the vibration data being produced by a vibration source in or on soil associated with the fiber optic cable. The device may normalize, based on the responsivity data, the vibration data. The device may determine, based on the normalized vibration data, a distance of the vibration source from the fiber optic cable. The device may perform one or more actions based on the distance satisfying a distance threshold.

20 Claims, 8 Drawing Sheets

SYSTEMS AND METHODS FOR IDENTIFYING THREAT DISTANCE TO FIBER OPTIC CABLE

BACKGROUND

A distributed acoustic sensing (DAS) system utilizes a fiber optic cable to obtain ambient vibration data associated with vibration signals along the fiber optic cable. For example, by using the fiber optic cable as a sensing element, the DAS system may obtain vibration signals (e.g., signal intensity data, frequency data) corresponding to each point along a length of the fiber optic cable.

DETAILED DESCRIPTION OF EXAMPLE EMBODIMENTS

Figure 1A:
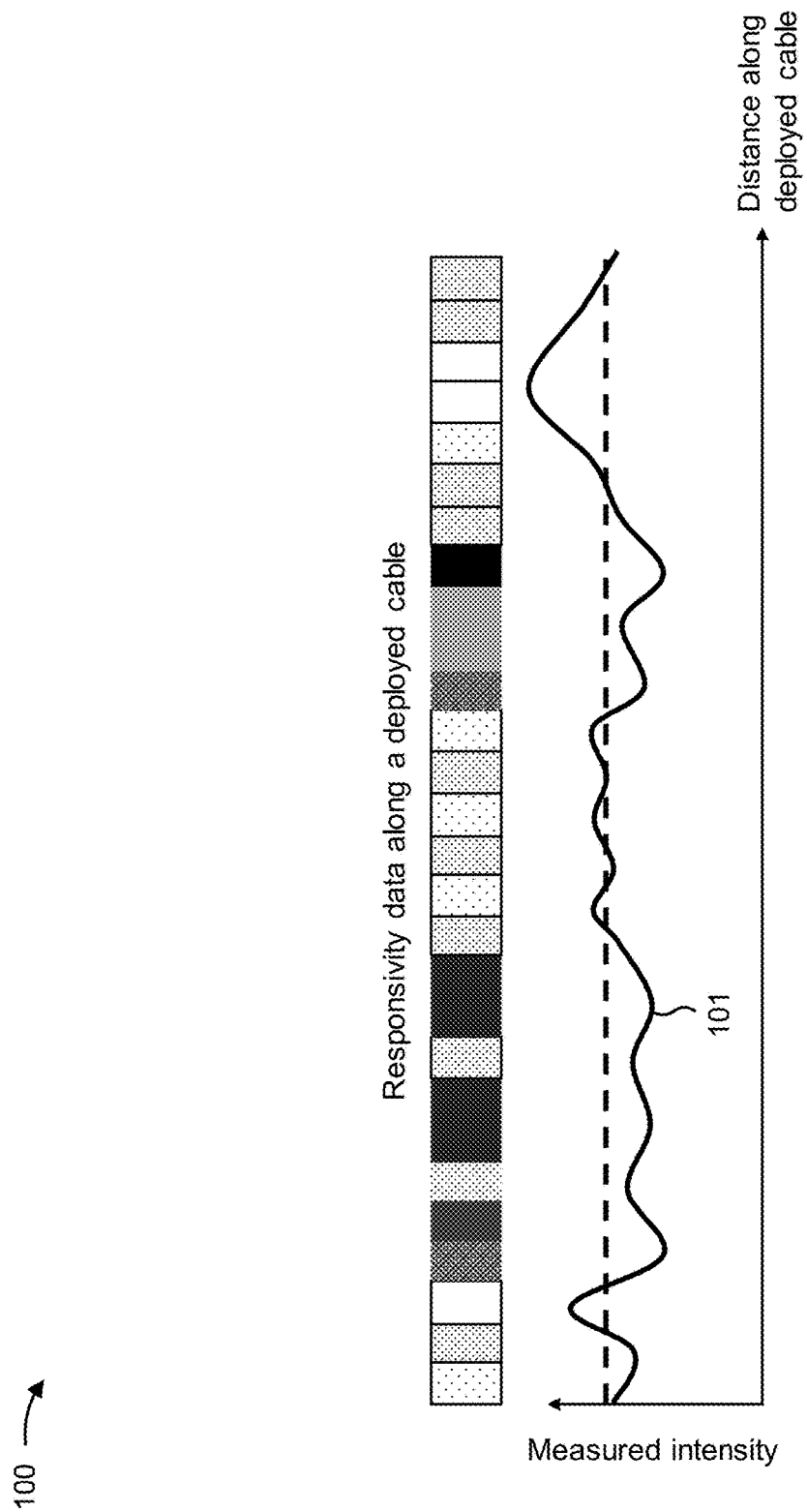
FIGS. 1A-1E are diagrams of one or more example implementations associated with identifying a threat distance to a fiber optic cable.

The following detailed description of example implementations refers to the accompanying drawings. The same reference numbers in different drawings may identify the same or similar elements.

To provide one or more services involving optical communication to a customer (e.g., fiber optic Internet, fiber optic cable), a service provider may route a fiber optic cable across an environment to connect the fiber optic cable to a premises of the customer. To protect the fiber optic cable (e.g., from weather conditions, animals, traffic incidents), the service provider may deploy the fiber optic cable underground. For example, depending on terrain and/or infrastructure within the environment, the service provider may arrange the fiber optic cable in a covered trench, within an underground duct, and/or the like. Because the fiber optic cable is hidden underground, a construction crew or other workers may unintentionally damage the fiber optic cable during an activity, such as excavation, construction, or demolition. For example, a member of the construction crew, using one or more pieces of equipment to penetrate the ground (e.g., an excavator, a jackhammer, a shovel), may cut the fiber optic cable and thereby disrupt service.

The service provider may identify a vibration source involved in activity (e.g., excavation, digging, or drilling) that could be a threat to the fiber optic cable. The service provide may attempt to determine how close the vibration source is to the fiber optic cable. The service provider may use sensor devices to sense signals where the fiber optic cable is laid. The sensor devices may provide sensing data. A device processing the sensing data may compute a distance between the fiber optic cable and the vibration source. However, the sensing data may not be accurate at some portions of the fiber optic cable, due to different deployment conditions and soil properties associated with the fiber optic cable. If the threat is closer to the fiber optic cable than the computed distance, the fiber optic cable runs a greater risk of being damaged. The damaged fiber optic cable may cause customer devices to consume resources (e.g., computing resources, networking resources) attempting to re-establish connectivity, restore a session, or contact the service provider. Additionally, the service provider may consume resources (e.g., computing resources, networking resources, vehicle resources) communicating with one or more customers regarding the disrupted service, investigating a source of the disrupted service, and/or repairing the fiber optic cable. If the threat is further from the fiber optic cable than what the computed distance conveys, the threat may not be a real issue. In this case, if the service provider determines that the computed distance is too short (even though the actual distance is not too short), the service provider may consume resources (e.g., computing resources, networking resources, vehicle resources) communicating with a team to investigate the activity and/or workers that are responsible for the activity. The workers may consume resources (e.g., computing resources, networking resources, vehicle resources) rearranging work schedules and work plans to avoid harming a fiber optic cable that is not really threatened by the activity.

Some implementations described herein provide a device (e.g., a fiber optic sensing analysis platform) that uses responsivity data for the fiber optic cable to compute a more accurate distance between the fiber optic cable and activity that may be a threat to the fiber optic cable. Responsivity data may include information that indicates how responsive segments of the fiber optic cable are to a vibration (e.g., acoustic, pneumatic) source. Responsivity data may be collected along the fiber optic cable by collecting measurements of an acoustic signal intensity for ambient vibration conditions that are consistent, or adjusted to be consistent, along the fiber optic cable. The device may obtain the responsivity data and receive vibration data from sensors that measure acoustic signals from a vibration source. The device may normalize the vibration data based on the responsivity data. The device may calculate a distance between the fiber optic cable and the vibration source based on the normalized vibration data of two or more points on the fiber optic cable. In some implementations, the device may calculate the distance further based on one or more vibration-dampening coefficients for soil on or around the two points on the fiber optic cable. Based on the calculated distance satisfying a distance threshold, the device may perform one or actions to prevent the activity from damaging the fiber optic cable and/or disrupting fiber optic communication.

By utilizing responsivity data to normalize vibration data, the device may more accurately calculate the distance between the vibration source and the fiber optic cable. An accurate distance may prevent damage to fiber optic cable, and the device may conserve resources that might otherwise have been consumed due to disrupted service. For example, the device may conserve resources that might otherwise have been consumed by the customer attempting to re-establish connectivity, restore a session, contact the service provider, and/or the like. Additionally, the device may conserve resources that might otherwise have been consumed by the service provider communicating with one or more customers regarding the disrupted service, investigating a source of the disrupted service, repairing the fiber optic cable, and/or the like. The more accurate distance may also prevent workers from rearranging a work schedule and/or work plan near a fiber optic cable, even though the activity does not pose a threat to the fiber optic cable. The device may conserve resources that might otherwise have been consumed by the service provider contacting the workers and by the workers unnecessarily rearranging the work schedule and/or work plan.

In the description that follows, a number of values will be provided to illustrate one or more aspects of the present disclosure. However, it should be understood that such values are provided merely as an example. In practice, other values may be utilized, the values may be represented in different forms, the values may include associated units, and/or the like.

FIGS. 1A-1E are diagrams of one or more example implementations 100 described herein. As shown in FIGS. 1A-1E, a fiber optic sensing analysis platform 102 may be associated with a fiber sensor device 104, which in turn may be coupled to a fiber optic cable 106. The fiber optic sensing analysis platform 102 may include a platform that stores and processes information associated with vibration signals. The fiber sensor device 104 may be a device (e.g., a distributed acoustic sensor, a distributed vibration sensor, an optical time-domain reflectometry (OTDR) device, and/or the like) that analyzes light characteristics in association with vibration signals. The fiber optic cable 106 may be a cable capable of detecting vibration signals and/or transmitting optical communication traffic.

A fiber optic cable may have a series of vibration or acoustic sensors at various points or segments along the fiber optic cable. Each sensor may have a different responsivity and may sense a particular level of signal intensity for a given disturbance. FIG. 1A shows a distribution of responsivity along an example fiber optic cable. The dashed line represents an ambient vibration level for the fiber optic cable. This may be due to general environmental noise caused by commercial activity, traffic, nature, and/or other activity that regularly occurs throughout the day and/or night. The solid line 101 shows a measured intensity of acoustic signals along the fiber optic cable. As shown by the solid line 101, the measured intensity may vary at different segments of the fiber optic cable for the same environmental noise. This variance shows a variance in responsivity along the fiber optic cable.

In some implementations, a vehicle may travel along the fiber optic cable, and a responsivity data collection device may take measurements of acoustic signal levels at the segment where the vehicle is located. Vibration caused by the vehicle may be observed, canceled, and/or averaged out to reveal a signal intensity that varies based on a deployment environment (e.g., soil, concrete, natural landmarks) around the fiber optic cable. The responsivity data collection device may be part of the fiber optic sensing analysis platform 102 or a separate device. The responsivity data collection device may generate responsivity data based on the measurements by the sensor devices along the fiber optic cable.

Figure 1B:
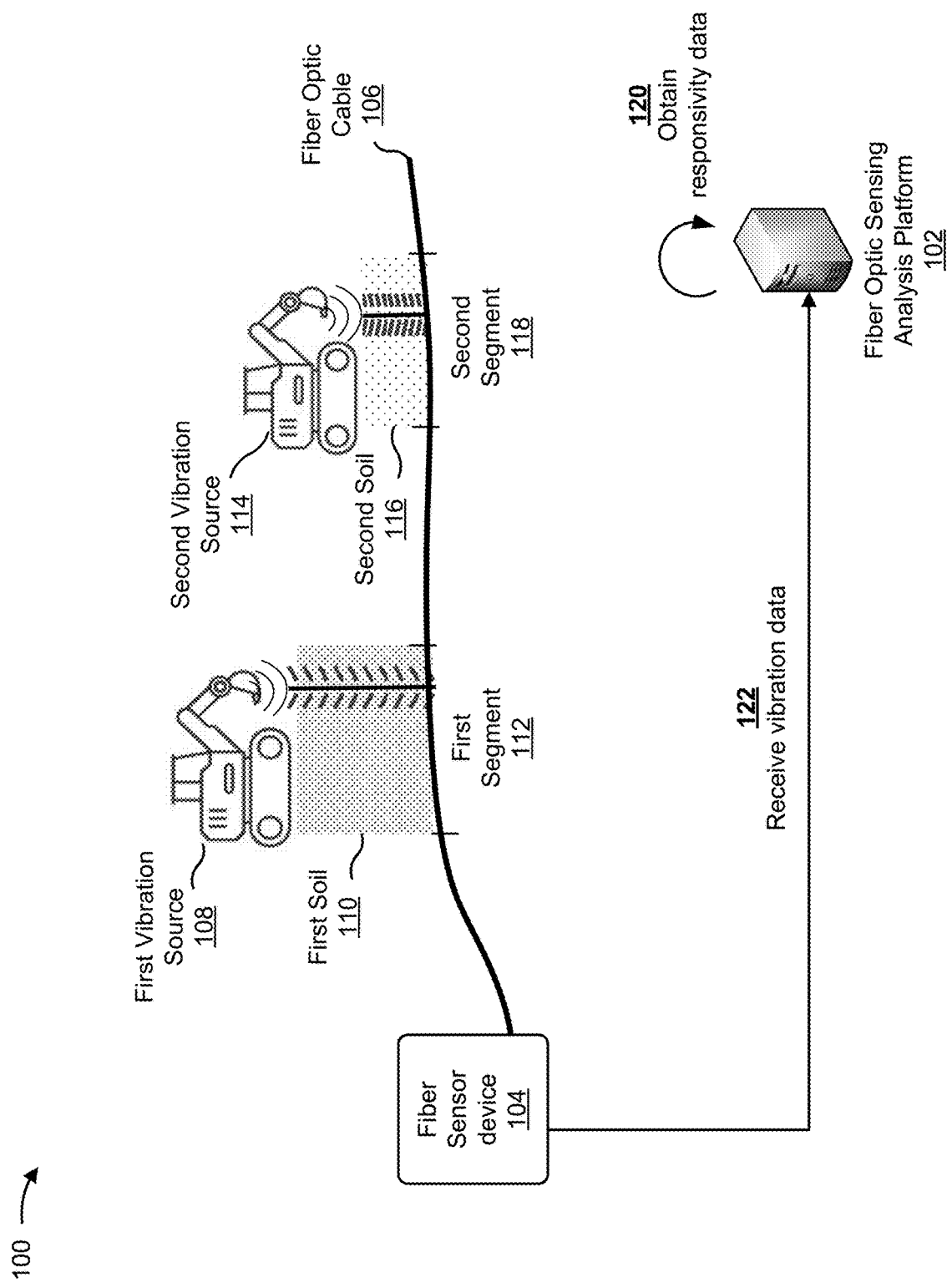

In FIG. 1B, an example fiber optic cable 106 is deployed underground to provide an optical communication service (e.g., fiber optic Internet, fiber optic cable, and/or the like) to one or more customers of a service provider. For example, the fiber optic cable 106 may extend beneath an environment in a trench, within a duct, and/or the like. Because the fiber optic cable 106 is hidden beneath the visible environment, a construction crew or other workers may be unaware of the fiber optic cable 106 and, as a result, conduct an activity (e.g., excavation, digging, drilling, and/or the like) that poses a threat of damage to the fiber optic cable 106. To prevent the activity from damaging the fiber optic cable 106, the service provider may utilize the fiber optic sensing analysis platform 102, the fiber sensor device 104, and the fiber optic cable 106 (collectively referred to herein as the fiber sensing system) to identify whether a vibration source is a threat to the fiber optic cable, by more accurately computing a distance between the vibration source and the fiber optic cable.

Because the fiber optic cable 106 may span large distances (e.g., in a range of approximately 40 miles to approximately 60 miles, and/or the like), the environment may include many different sources of vibration. Sources of vibration that may contribute to an average environmental vibration level may include a factory, a forest, a river, a highway, or other environmental sources of vibration that may produce vibration signals at different times of day, at different days within a week, having different amplitudes, different frequencies, and/or the like. Due to additive properties of sound, vibration signals produced by construction equipment may differ based on how far a vibration source is from the fiber optic cable. Furthermore, due to different installation techniques and/or different environmental conditions, the fiber optic cable 106 may have different levels of responsivity. As a result, different segments of the fiber optic cable 106 may react differently to the same vibration.

As shown in FIG. 1B, a first vibration source 108 (e.g., excavator) on a first soil 110 above a first segment 112 of the fiber optic cable 106 may cause one or more sensor devices to detect acoustic signals that are greater than an ambient vibration level. A second vibration source 114 (e.g., excavator) on a second soil 116 above a second segment 118 of the fiber optic cable 106 may also generate acoustic signals.

The first vibration source 108 may be far from the first segment 112, but due to the type of the first soil 110, the fiber sensor device 104 may receive an intensity value of an acoustic signal caused by the first vibration source 108 that is greater than intensity values for acoustic signals detected elsewhere. Without responsivity data for the first segment 112 and the second segment 118, the fiber optic sensing analysis platform 102 may calculate a distance between the vibration source 108 and the first segment 112 that is much smaller than the actual distance. Conversely, the fiber optic sensing analysis platform 102 may compute a distance between the second vibration source 114 and the second segment 118, and due to deployment conditions and vibration-dampening properties of the second soil 116, the computed distance may be larger than the actual distance. This may lead to damage to the fiber optic cable 106 if the actual distance is rather close to the fiber optic cable 106.

To compute a more accurate distance between a vibration source and the fiber optic cable 106, the fiber optic sensing analysis platform 102 may use responsivity data to normalize vibration data received from the fiber sensor device 104. As shown by reference number 120, the fiber optic sensing analysis platform 102 may obtain responsivity data. The responsivity data may include a distribution of responsivity values for segments of the fiber optic cable 106. The responsivity data may reflect deployment conditions and soil types associated with a segment. Vibrations may be dampened by certain soil and ground compositions. For example, the first soil 110 may be of a soil type that dampens sound less than a soil type of the second soil 116. The first soil 110 may cause a sensor to sense a higher level of intensity of an acoustic signal than for the second soil 116, even if an equivalent excavator is the same distance from the fiber optic cable on the first soil 110 as on the second soil 116.

The responsivity data may include or be part of an ambient vibration profile that indicates measures of vibration (e.g., amplitude, frequency) as a function of distance along the fiber optic cable 106. Additionally, or alternatively, the ambient vibration profile may indicate the one or more measures of vibration as a function of time. Thus, in some implementations, the ambient vibration profile may be a multivariate data set. To determine the ambient vibration profile, the fiber optic sensing analysis platform 102 may utilize one or more data analysis techniques (e.g., a regression analysis technique, a chi-squared test technique, and/or the like) to determine representative values of the one or more measures of vibration (e.g., based on the environment being free from construction activities and/or other anomalies) at different locations along the fiber optic cable 106 and/or different times of day.

In some implementations, the service provider may obtain, via acoustic testing and/or geological information, acoustic information about soil types along the fiber optic cable 106. The information may be stored as vibration-dampening coefficients for types of soil in one or more data structures, such as in a vibration-dampening coefficient look-up table. Different vibration-dampening coefficients may correspond to different soil types. The fiber optic sensing analysis platform 102 may use the vibration-dampening coefficients when calculating a distance. For example, the fiber optic sensing analysis platform 102 may determine an approximate location of a vibration source due to sensing data from specific sensors. The fiber optic sensing analysis platform 102 may look up a vibration-dampening coefficient corresponding to the approximate location and incorporate the coefficient into an equation for computing the distance.

As shown by reference number 122, the fiber optic sensing analysis platform 102 may receive vibration data associated with detected activity. The fiber optic sensing analysis platform 102 may receive the vibration data from fiber sensor device 104. Fiber sensor device 104, within a period of time, may inject a series of pulses of light into the fiber optic cable 106 and, using one or more techniques (e.g., coherent Rayleigh optical time domain reflectometry (COTDR)), interpret backscatter from the pulses of light to map sensing data to corresponding locations along the fiber optic cable 106. For example, the fiber sensor device 104 may inject a first pulse of light, of the series of pulses of light, into the fiber optic cable 106. As the first pulse of light travels along the fiber optic cable 106, a first vibration signal produced by the first vibration source 108 may disrupt the first pulse of light at a first segment 112, causing the first pulse of light to form backscatter and return to the fiber sensor device 104. The fiber sensor device 104 may detect the backscatter from the first segment 112 and analyze the backscatter to generate a first set of vibration data associated with the first vibration signal (e.g., a first amplitude, a first frequency). The fiber sensor device 104 may repeat this process with a second pulse of light, a third pulse of light, and/or the like, in order to obtain vibration data for other locations or segments of the fiber optic cable 106. For example, similar to that described above, a second vibration signal produced by the second vibration source 114 may cause backscatter of a second pulse of light at the second segment 118. The fiber sensor device 104 may generate a second set of vibration data associated with the second vibration signal (e.g., a second amplitude, a second frequency).

The fiber sensor device 104 may provide the vibration data to the fiber optic sensing analysis platform 102. The fiber sensor device 104 may provide the vibration data in batches (e.g., on a triggered basis, on a periodic basis, on a scheduled basis, and/or the like), as a completed set of data, and/or the like. For example, the fiber sensor device 104 may indicate, for multiple times of day, multiple days, and every segment of the fiber optic cable 106 (e.g., every one-meter segment, every five-meter segment), a respective amplitude and frequency. In some implementations, the fiber sensor device 104 may be pre-configured to provide the sensing data to the fiber optic sensing analysis platform 102 (e.g., without receiving a request). In such a case, the fiber sensor device 104 may update and transmit the sensing data to the fiber optic sensing analysis platform 102 according to a predetermined schedule (e.g., once every 3 months, once every 6 months).

As will be described below in connection with FIG. 1C, the fiber optic sensing analysis platform 102 may normalize the vibration data based on the responsivity data and calculate a distance from a vibration source to the fiber optic cable 106.

As shown by reference number 130, based on the responsivity data, the fiber optic sensing analysis platform 102 may normalize the vibration data to account for deployment conditions. The deployment conditions may cause an increase or a decrease of an intensity level of an acoustic signal from the vibration source relative to an ambient vibration level of the environment. In some implementations, the fiber optic sensing analysis platform 102 may increase or decrease a recorded intensity value for the acoustic signal based on the responsivity data. For example, if responsivity data for a segment of the fiber optic cable indicates a higher than average vibration dampening by the environment around the segment, the device may increase the intensity value for the acoustic signal that may be used to calculate the distance. For example, if responsivity data indicates a 25% decrease in signal intensity at the first segment 112, relative to an average signal intensity for the rest of the fiber optic cable 106, the fiber optic sensing analysis platform 102 may increase a signal intensity value for acoustic signals at the first segment 112. The responsivity data may include a fixed percentage, a fixed amount, a relative percentage, and/or a relative amount by which to increase or decrease a signal intensity value of an acoustic signal. The responsivity data may be specific to locations on the fiber optic cable 106 (e.g., segment-specific). Additionally, or alternatively, the responsivity data may provide statistics or other information by which to normalize vibration data. The normalized vibration data may more accurately represent a relationship for signal intensity relative to propagation distance.

As shown by reference number 132, the fiber optic sensing analysis platform 102 may calculate a distance between the vibration source and the fiber optic cable 106. The vibration data may trigger calculation of a distance if intensity values of one or more acoustic signals satisfy vibration deviation criteria, relative to an ambient vibration profile. The vibration deviation criteria, depending on the type of vibration data that defines the ambient vibration profile (e.g., amplitude data, frequency data, and/or the like), may be a deviation threshold above and/or below the ambient vibration profile. As used herein, satisfying the vibration deviation criteria may, depending on the context, refer to a value being greater than the deviation threshold, greater than or equal to the deviation threshold, less than the deviation threshold, less than or equal to the deviation threshold, equal to the deviation threshold, etc. So as to not trigger a response based on normal vibration variance, the deviation threshold may be in a range of, for example, approximately 8% to approximately 12% above and/or below the measure of vibration indicated by the ambient vibration profile. For example, the deviation threshold may be in the range of approximately 8% to approximately 12% above and/or below the amplitude and/or the frequency indicated by the ambient vibration profile. In some implementations, the fiber optic sensing analysis platform 102 may determine the vibration deviation criteria based on one or more characteristics of the sensing data, such as variance or standard deviation. In such an example, the deviation threshold may be based on not only a representative value of amplitude and/or frequency at a particular location and a particular time of day, but also on underlying vibration data and/or a duration of the deviation. Furthermore, so as to not trigger a response based on temporary deviations in vibration (e.g., based on a vehicle passing through the environment, and/or the like), a duration threshold may be greater than or equal to approximately 5 minutes. In some implementations, the duration threshold may be greater than or equal to approximately 10 minutes. Other deviation thresholds and/or duration thresholds may alternatively be used.

For example, relative to a baseline amplitude of approximately Level 7.8 at the first segment 112, the deviation threshold may be approximately Level 8.6. As such, the vibration data, which indicates an amplitude of Level 10.0 at the first segment 112, may exceed the deviation threshold. Based on the fiber optic sensing analysis platform 102 monitoring the vibration data, the fiber optic sensing analysis platform 102 may determine that the vibration data continues to exceed the deviation threshold for more than 5 minutes. Because the vibration data satisfies the vibration deviation criteria and the duration threshold, the vibration data may indicate that the environment includes an activity associated with an increased likelihood of damage to the fiber optic cable 106 relative to the vibration data.

Based on a calculation trigger, the fiber optic sensing analysis platform 102 may calculate the distance between the vibration source and the fiber optic cable 106. For example, to calculate a distance between the first vibration source 108 and the fiber optic cable 106 at the first segment 112, the fiber optic sensing analysis platform 102 may use one of at least two approaches. A first approach includes using a triangle method to calculate the distance using normalized vibration data and a vibration-dampening coefficient. A second approach includes using a two triangle method that does not use a vibration-dampening coefficient.

In an example of the first approach, the fiber optic sensing analysis platform 102 may calculate the distance based on normalized signal intensity values from two locations on the fiber optic cable 106. As shown in FIG. 1C, the first vibration source 108 may be at location a and vibration data may be received for first location b and for second location c. The two locations are separated by length L. The fiber optic sensing analysis platform 102 may calculate distance D using an equation such as $L^2-X^2/2X$, where $X=1/\alpha(\ln(S_b/S_c))$ and ln is a natural logarithm function. The term a may represent a relevant vibration-dampening coefficient, $S_b$ may represent a normalized signal intensity value at first location b, and $S_c$ may represent a normalized signal intensity value at second location c.

Figure 1C:
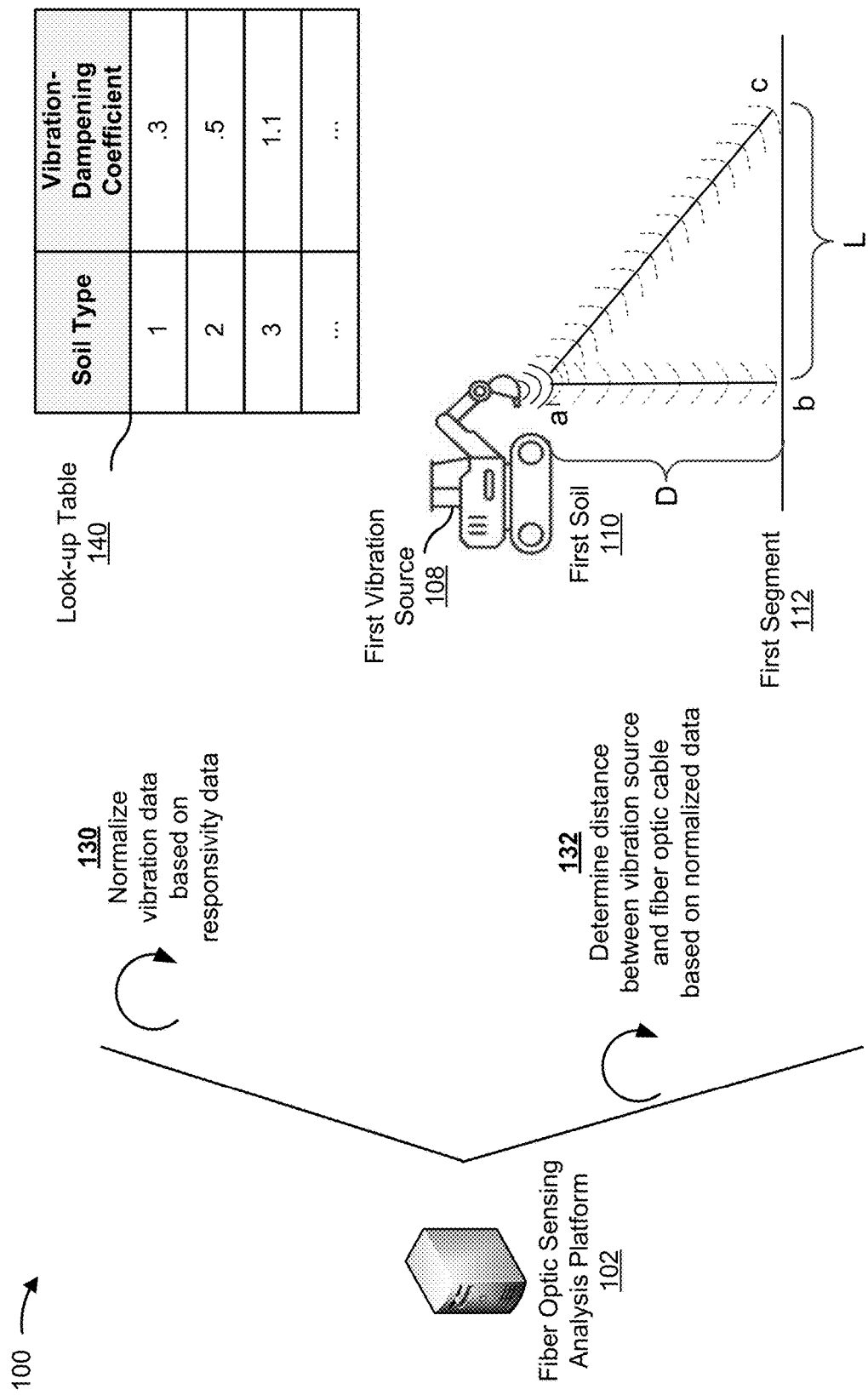

The fiber optic sensing analysis platform 102 may obtain the relevant vibration-dampening coefficient from stored information, such as from look-up table 140 shown in FIG. 1C. The look-up table 140 may include coefficients for multiple soil types. For example, the look-up table 140 may show a coefficient of 0.3 for soil type 1. If the first segment 112 is associated with soil type 1, the coefficient of 0.3 may be used for term a in the equation, which increases a value for a normalized signal intensity value ratio for the two locations. By contrast, if the first segment 112 is associated with soil type 3, the coefficient of 1.1 may be used for term a in the equation, which decreases the value of the normalized signal intensity value ratio. As a result of normalizing the vibration data and using the vibration-dampening coefficient, the fiber optic sensing analysis platform 102 may calculate a more accurate distance between the first vibration source 108 and the fiber optic cable 106. This may lead to better decision making for protecting the fiber optic cable 106 while conserving time, power, and device resources.

Figure 1D:
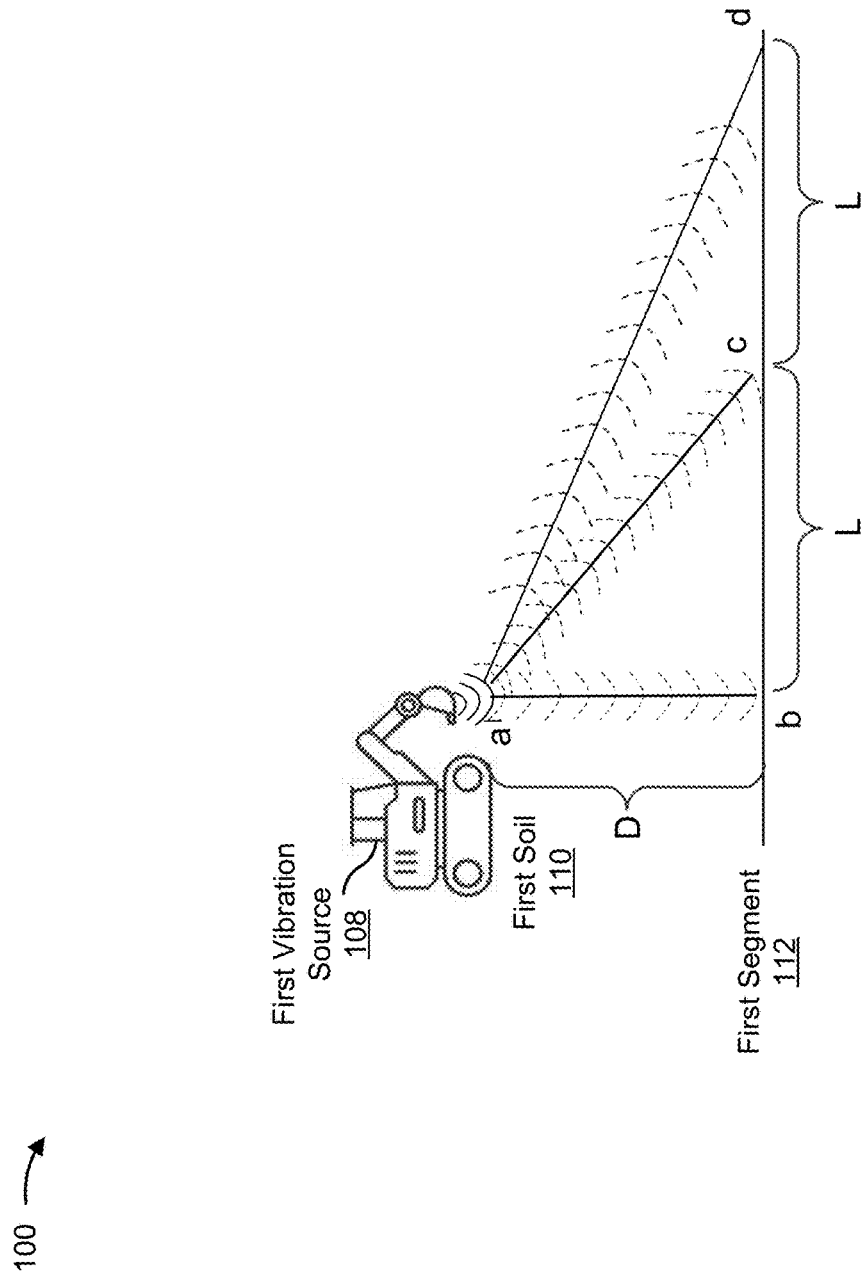

FIG. 1D shows the second approach, or the two triangle approach, where the fiber optic sensing analysis platform 102 may calculate the distance based on normalized signal intensity values from three locations on the fiber optic cable 106, separated by two lengths. In addition to first location b and second location c, vibration data may be received for third location d. First location b and second location c are separated by length L, and second location c and third location d may also be separated by length L. Distance D may involve calculating a ratio R of $(S_b/S_c)/(S_b/S_d)$. $S_d$ represents a normalized signal intensity value at location d. Distance $f_c=\text{sqrt}(D^2+L^2)-D$ and distance $f_d=R(\text{sqrt}(D^2+4L^2)-D)$. The fiber optic sensing analysis platform 102 may calculate distance D based on where values for $f_c$ and $f_d$ are equal. While this second approach is independent of vibration-dampening coefficients, in some implementations, vibration-dampening coefficients may increase or decrease ratio R. This second approach may also lead to better decision making for protecting the fiber optic cable 106 while conserving time, power, and device resources.

Figure 1E:
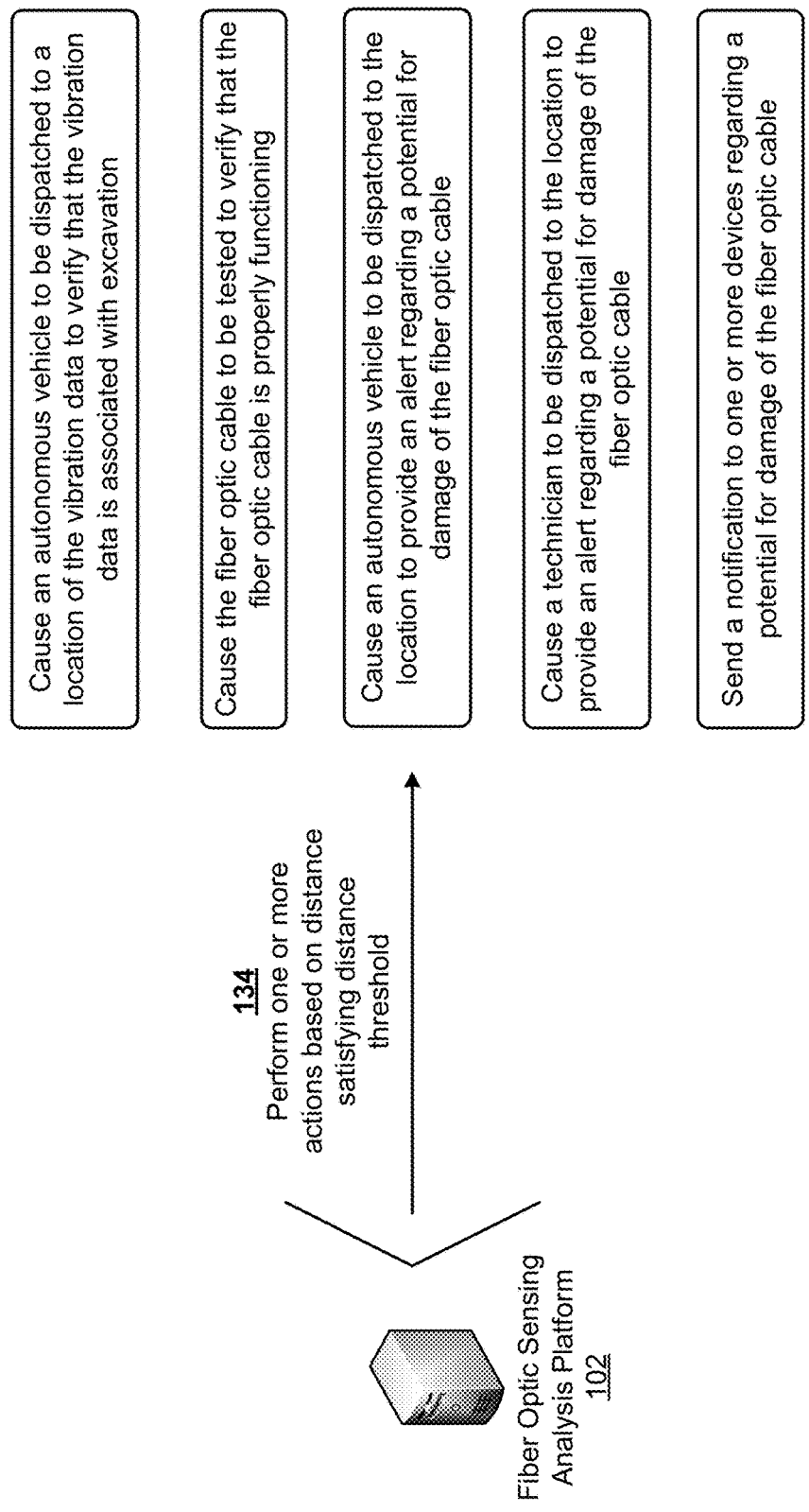

As shown by reference number 134 in FIG. 1E, the fiber optic sensing analysis platform 102 may perform one or more actions based on the distance satisfying a distance threshold. If the distance satisfies the distance threshold (e.g., closer distance), the fiber optic sensing analysis platform 102 may perform the one or more actions to verify activity, verify proper functioning of the fiber optic cable 106, minimize a potential of damage to the fiber optic cable 106, and/or the like. For example, the one or more actions may include causing an autonomous vehicle to be dispatched to the first segment 112 to verify that the first vibration source 108 is associated with the activity. For example, the fiber optic sensing analysis platform 102 may transmit an instruction to the autonomous vehicle (e.g., an unmanned aerial vehicle). The instruction may indicate that the autonomous vehicle is to travel to the first segment 112, determine whether the environment includes the activity (e.g., by using one or more sensors, one or more cameras, and/or the like) and/or transmit a report regarding the first vibration source 108 to the fiber optic sensing analysis platform 102. Based on receiving the report, the fiber optic sensing analysis platform 102 may determine that the first vibration source 108 is the activity, thereby necessitating further action to prevent the activity from damaging the fiber optic cable 106.

To identify a geographic location of the first segment 112 (and other locations along the fiber optic cable 106), the fiber optic sensing analysis platform 102 may operate in conjunction with one or more additional devices to obtain correlated location data associated with the fiber optic cable 106. For example, the one or more additional devices may include a vibration device and/or a measurement platform. In such an example, the vibration device may generate a series of vibrations having predetermined frequencies and predetermined amplitudes along a predetermined geographic route that approximates a path of the fiber optic cable 106. Similar to that described above, the fiber sensor device 104 may interpret backscatter of light from the fiber optic cable 106 to determine a distance between the first segment 112 of the fiber optic cable 106 and a geographic location of a vibration. Based on the distance and the geographic location of the vibration, the measurement platform may determine the geographic location of the first segment 112 along the fiber optic cable 106. The measurement platform may transmit the geographic location to the fiber optic sensing analysis platform 102. In some implementations, the fiber optic sensing analysis platform 102 may approximate the geographic location of the first segment 112 (and other locations along the fiber optic cable 106) using the sensing data and geographic data associated with the environmental sources of vibration.

Additionally, or alternatively, the one or more actions may include causing the fiber optic cable 106 to be tested to verify that the fiber optic cable 106 is properly functioning. For example, the fiber optic sensing analysis platform 102 may transmit an instruction to the fiber sensor device 104. The instruction may indicate that the fiber sensor device 104 is to run a test (e.g., by injecting one or more light pulses into the fiber optic cable 106) to verify that the fiber optic cable 106 is properly functioning and the new sensing data is accurate, transmit a report based on a result of the test, and/or the like. The instruction may indicate that the fiber sensor device 104 is to run the test on an on-demand basis, on a periodic basis, on a scheduled basis, and/or the like. Based on receiving the instruction, the fiber sensor device 104 may run the test and communicate with the fiber optic sensing analysis platform 102 that the fiber optic cable 106 is properly functioning.

Additionally, or alternatively, the one or more actions may include causing an autonomous vehicle to be dispatched to the first segment 112 to provide an alert regarding a potential for damage of the fiber optic cable 106. For example, the fiber optic sensing analysis platform 102 may transmit an instruction to the autonomous vehicle (e.g., an unmanned aerial vehicle). The instruction may indicate that the autonomous vehicle is to travel to the first segment 112, provide the alert (e.g., auditorily, visually) regarding a presence of the fiber optic cable 106, transmit a report regarding the alert to the fiber optic sensing analysis platform 102, and/or the like. Based on receiving the instruction, the autonomous vehicle may provide the alert to the construction crew to cause the construction crew to cease the activity and/or transmit the report to the fiber optic sensing analysis platform 102.

Additionally, or alternatively, the one or more actions may include causing a technician to be dispatched to the first segment 112 to provide an alert regarding a potential for damage of the fiber optic cable 106. For example, the fiber optic sensing analysis platform 102 may transmit an instruction to a device of the technician nearest to the first segment 112. The instruction may indicate that the technician is to travel to the first segment 112 (e.g., via a vehicle), provide the alert to the construction crew involved in the activity, and/or provide a report regarding the alert to the fiber optic sensing analysis platform 102. Based on receiving the instruction, the technician may provide the alert to the construction crew to cause the construction crew to cease the activity and/or provide the report to the fiber optic sensing analysis platform 102. In some implementations, transponders may be connected around the fiber, on the ground, and/or on a pole or structure nearby. The transponders may alert the construction crew by vibration, ringing, or some other noise if the activity exceeds an activity threshold or if a vibration exceeds a vibration threshold.

Additionally, or alternatively, the one or more actions may include sending a notification to one or more devices regarding a potential for damage to the fiber optic cable 106. For example, the fiber optic sensing analysis platform 102 may transmit the notification to a device of the technician nearest to the first segment 112, to a device of a member of the construction crew, and/or the like. Based on receiving the notification, the technician and/or the member of the construction crew may cause the construction crew to cease the activity.

By analyzing sensing data to identify, in real-time or near real-time, activities that may pose a threat of damage to the fiber optic cable 106, the fiber optic sensing analysis platform 102 may protect the fiber optic cable 106. As a result, the fiber optic sensing analysis platform 102 may conserve resources that might otherwise have been consumed due to damage to the fiber optic cable 106 and/or disrupted service. For example, the fiber optic sensing analysis platform 102 may conserve resources that might otherwise have been consumed by the customer attempting to re-establish connectivity, restore a session, contact the service provider, and/or the like. Additionally, the fiber optic sensing analysis platform 102 may conserve resources that might otherwise have been consumed by the service provider communicating with one or more customers regarding the disrupted service, investigating a source of the disrupted service, repairing the fiber optic cable 106, and/or the like.

As indicated above, FIGS. 1A-1E are provided merely as examples. Other examples may differ from what was described with regard to FIGS. 1A-1E. The number and arrangement of devices and networks shown in FIGS. 1A-1E are provided as an example. In practice, there may be additional devices and/or networks, fewer devices and/or networks, different devices and/or networks, or differently arranged devices and/or networks than those shown in FIGS. 1A-1E. For example, while a single sensor device (e.g., fiber sensor device 104) has been described, it should be understood that the fiber sensing system may include a plurality of sensor devices positioned at respective segments of the fiber optic cable 106. In such an example, each of the plurality of sensor devices may be configured to communicate with the fiber optic cable 106 and the fiber optic sensing analysis platform 102. Furthermore, two or more devices shown in FIGS. 1A-1E may be implemented within a single device, or a single device shown in FIGS. 1A-1E may be implemented as multiple, distributed devices. Additionally, or alternatively, a set of devices (e.g., one or more devices) of FIGS. 1A-1E may perform one or more functions described as being performed by another set of devices of FIGS. 1A-1E.

Figure 2:
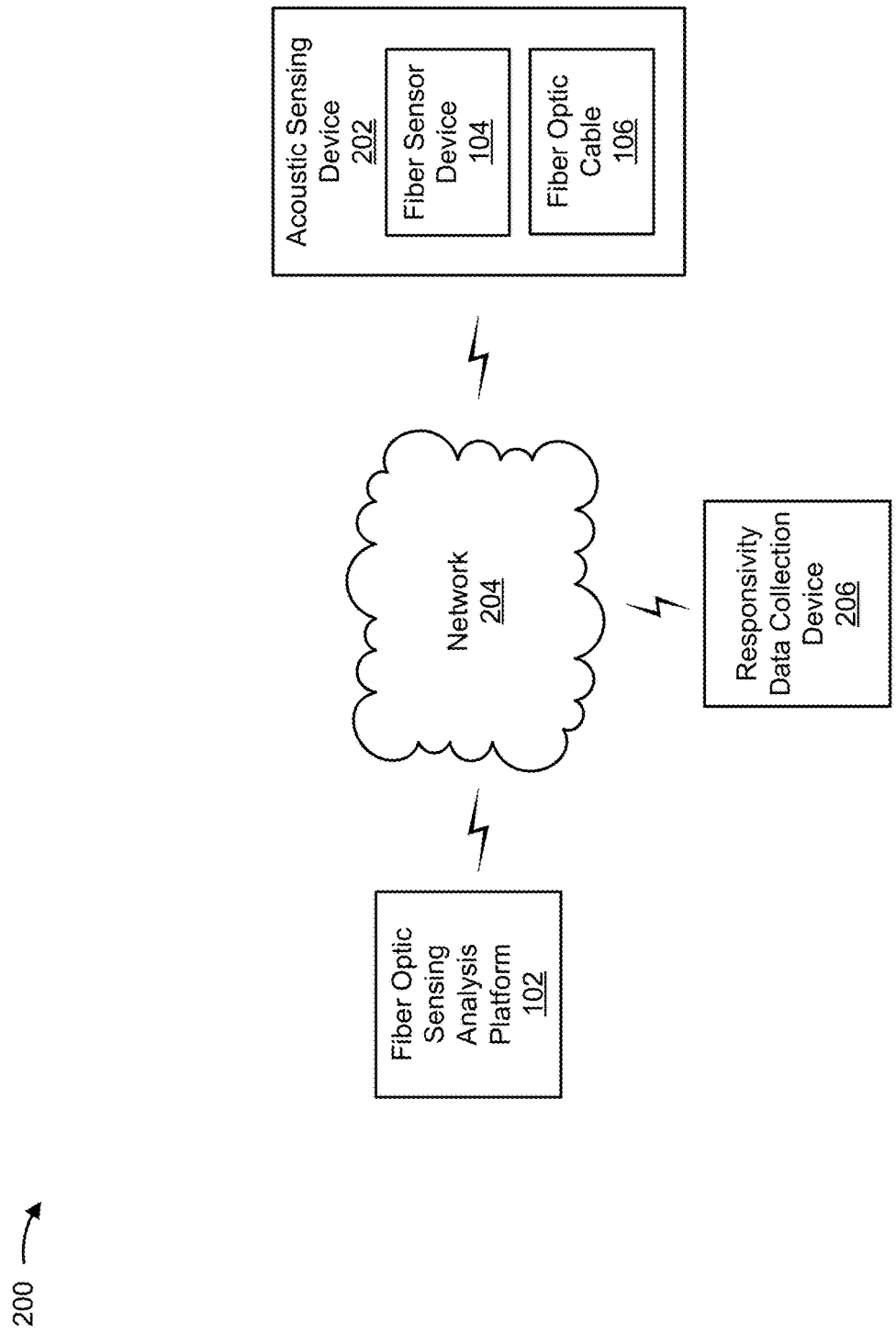
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include the fiber optic sensing analysis platform 102, an acoustic sensing device 202, a network 204, and an optional responsivity data collection device 206. The acoustic sensing device may include the fiber sensor device 104 and the fiber optic cable 106. The devices of the environment may interconnect via wired connections, wireless connections, or a combination of wired and wireless connections.

Fiber optic sensing analysis platform 102 includes one or more devices capable of receiving, generating, storing, processing, and/or providing information associated with vibration signals. For example, the fiber optic sensing analysis platform 102 may include a server device, a laptop computer, a tablet computer, a desktop computer, a group of server devices, a cloud computing device, and/or the like. In some implementations, the fiber optic sensing analysis platform 102 may receive and process information from the acoustic sensing device 202 and/or provide information to the acoustic sensing device 202.

Acoustic sensing device 202 includes one or more devices capable of detecting vibration signals and/or receiving, generating, storing, processing, and/or providing information associated with the vibration signals. For example, as indicated above, the acoustic sensing device 202 may include the fiber sensor device 104 and the fiber optic cable 106. The fiber sensor device 104, of the acoustic sensing device 202, is a device capable of analyzing light characteristics in association with vibration signals and communicating with the fiber optic sensing analysis platform 102 regarding the vibration signals. For example, the fiber sensor device 104 may be a distributed acoustic sensing (DAS) device, such as an optoelectronic device and/or an optical time-domain reflectometry (OTDR) device. The fiber optic cable 106, of the acoustic sensing device 202, is a cable capable of being used as an acoustic sensing element and/or transmitting optical communication traffic. For example, the fiber optic cable 106 may include one or more optical fibers, along which one or more pulses of light may travel, and one or more additional materials surrounding a glass core. The acoustic sensing device 202 may detect vibration signals (e.g., via the fiber optic cable 106) and/or communicate with the fiber optic sensing analysis platform 102 regarding the vibration signals (e.g., via the fiber sensor device 104).

Network 204 includes one or more wired and/or wireless networks. For example, network 204 may include a cellular network (e.g., a long-term evolution (LTE) network, a code division multiple access (CDMA) network, a third generation (3G) network, a fourth generation (4G) network, a fifth generation (5G) network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks. The network 204 enables communication among the devices of environment 200.

Responsivity data collection device 206 includes one or more devices capable of measuring responsivity data or assisting with measuring of responsivity data. In some implementations, rather than being a separate device that provides responsivity data to the fiber optic sensing analysis platform 102, the responsivity data collection device 206 may be part of the fiber optic sensing analysis platform 102. The responsivity data collection device 206 may obtain measurements of acoustic signal intensities along the fiber optic cable 106. In some implementations, the measurements are obtained from the fiber sensor device 104 in coordination with location and environmental data obtained from a surface above or near the fiber optic cable 106. For example, a vehicle may travel along the fiber optic cable 106, and the fiber sensing device 104 may obtain vibration data for segments that correspond to a moving location of the vehicle. The location may be determined by the fiber optic sensing analysis platform 102, the fiber sensing device 104, and/or by a device in the vehicle. Signal intensities may be associated with segments, to assist with generating a responsivity distribution for the segments of the fiber optic cable 106. The fiber sensing device 104 may provide the measurements to the fiber optic sensing analysis platform 102 or the responsivity data collection device 206.

If the responsivity data collection device 206 receives the measurements, the responsivity data collection device 206 may generate the responsivity distribution of the segments based on a location of each segment and a measurement for each segment. The responsivity data collection device 206 may cancel out anomalies, average out other signals, and/or take other actions to clean up the responsivity distribution. The responsivity distribution may be generated for different periods of time. For example, the vehicle may travel along the fiber optic cable 106 multiple times on different days and at different times during the day, in order to obtain a better average of the responsivity distribution. The responsivity data collection device 206 may provide the responsivity distribution and other information as responsivity data to the fiber optic sensing analysis platform 102.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
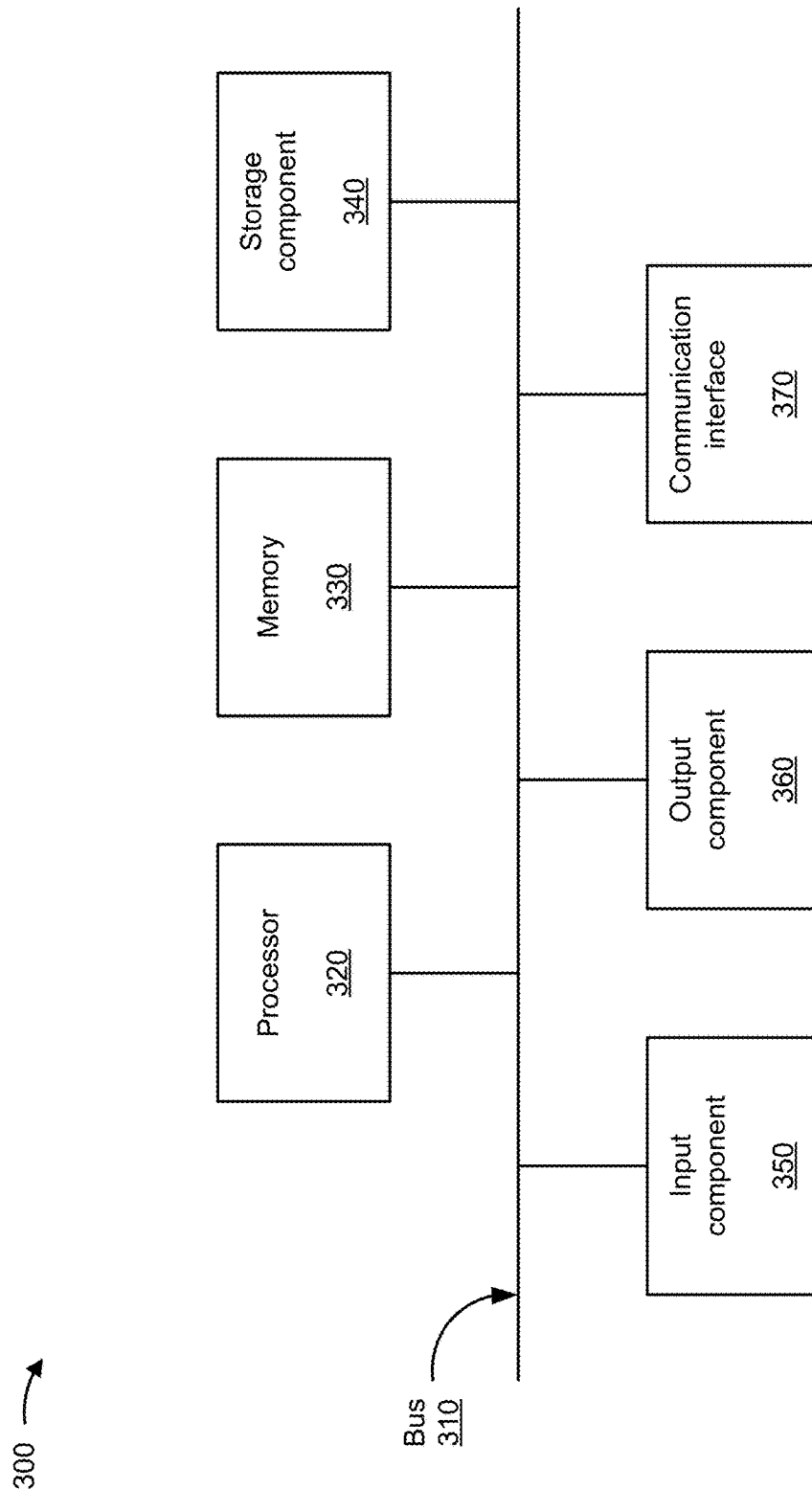
FIG. 3 is a diagram of example components of one or more devices of FIG. 2.

FIG. 3 is a diagram of example components of a device 300. Device 300 may correspond to the fiber optic sensing analysis platform 102, the fiber sensor device 104, the acoustic sensing device 202, and/or the responsivity data collection device 206. In some implementations, the fiber optic sensing analysis platform 102, the fiber sensor device 104, the acoustic sensing device 202, and/or the responsivity data collection device 206 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
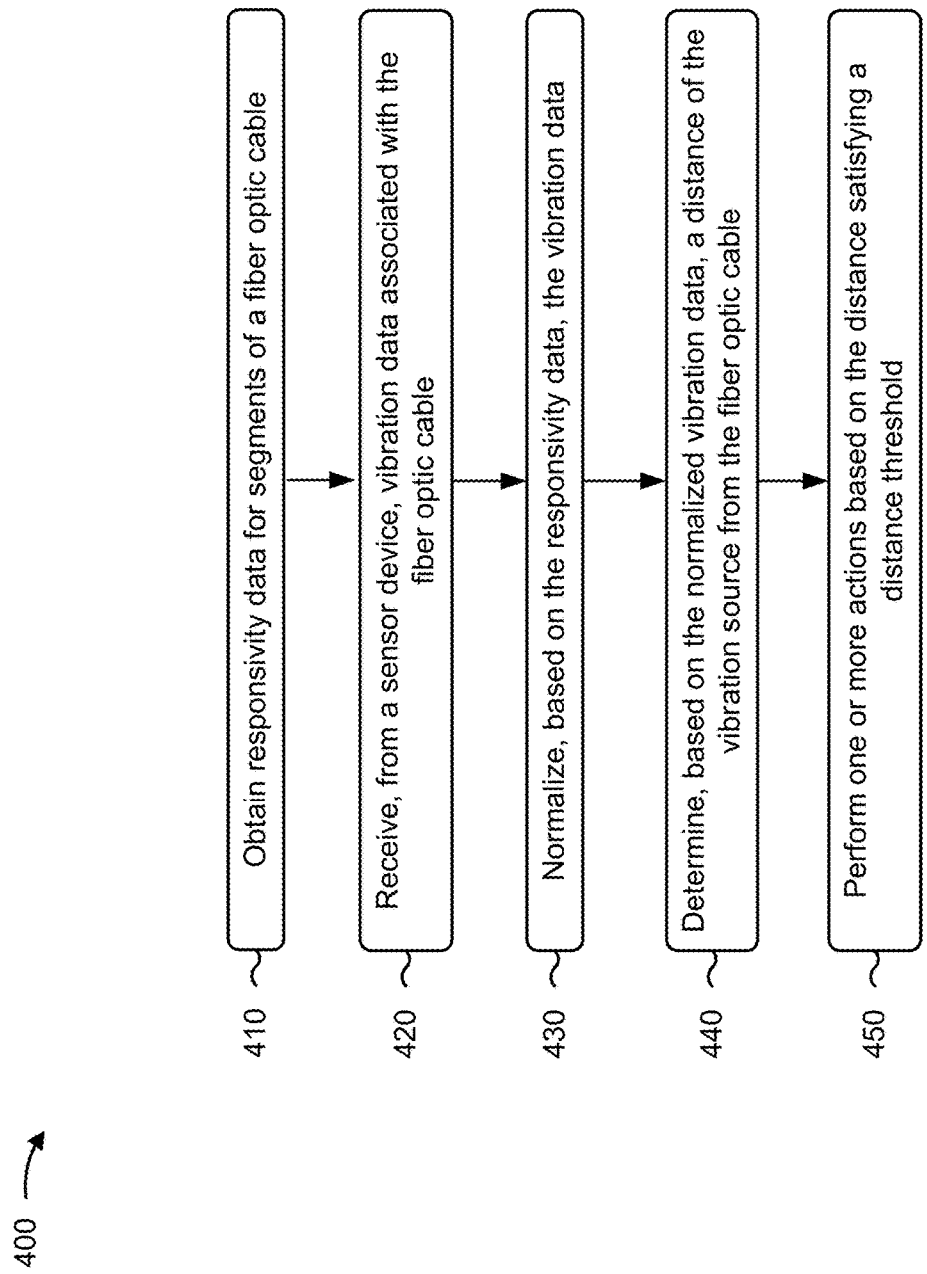
FIG. 4 is a flowchart of an example process relating to identifying a threat distance to a fiber optic cable.

FIG. 4 is a flowchart of an example process 400 associated with systems and methods for identifying a threat distance to a fiber optic cable. In some implementations, one or more process blocks of FIG. 4 may be performed by a device (e.g., acoustic sensing device 202, which includes fiber sensor device 104, and/or fiber optic cable 106). In some implementations, one or more process blocks of FIG. 4 may be performed by another device or a group of devices separate from or including the device, such as a responsivity data device (e.g., the responsivity data collection device 206). Additionally, or alternatively, one or more process blocks of FIG. 4 may be performed by one or more components of device 300, such as processor 320, memory 330, storage component 340, input component 350, output component 360, and/or communication interface 370.

As shown in FIG. 4, process 400 may include obtaining responsivity data for segments of a fiber optic cable (block 410). For example, the device may obtain responsivity data for segments of a fiber optic cable, as described above. In some implementations, the responsivity data includes measurements of responsivity of the fiber optic cable at the segments of the fiber optic cable. Responsivity for one segment may be different than responsivity for another segment.

As further shown in FIG. 4, process 400 may include receiving, from a sensor device, vibration data associated with the fiber optic cable (block 420). For example, the device may receive, from a sensor device, vibration data associated with the fiber optic cable, the vibration data being produced by a vibration source in or on soil associated with the fiber optic cable, as described above. The vibration data may be received from a sensor device. The vibration data may be produced by an environment associated with the fiber optic cable over a period of time. The vibration data may include sensing data associated with a vibration signal that is detected at a location along the fiber optic cable. The vibration data may include an amplitude of the vibration signal that is comparable to baseline vibration data. The vibration data may trigger a distance calculation if an amplitude and a duration of the vibration data deviate from a baseline amplitude and a baseline duration by an amount that satisfies a vibration deviation threshold.

As further shown in FIG. 4, process 400 may include normalizing, based on the responsivity data, the vibration data (block 430). For example, the device may normalize, based on the responsivity data, the vibration data, as described above. The vibration data may reflect an intensity of amplitude of acoustic signals, and the device may increase or decrease a recorded intensity value for the acoustic signal based on the responsivity data. For example, if responsivity data for a segment of the fiber optic cable indicates a higher than average vibration dampening by the environment around the segment, the device may increase the intensity value for the acoustic signal.

As further shown in FIG. 4, process 400 may include determining, based on the normalized vibration data, a distance of the vibration source from the fiber optic cable (block 440). For example, the device may determine, based on the normalized vibration data, a distance of the vibration source from the fiber optic cable, as described above. In some implementations, determining the distance includes determining the distance further based on using a vibration-dampening coefficient corresponding to a type of soil associated with the fiber optic cable. The device may obtain the vibration-dampening coefficient from a look-up table of vibration-dampening coefficients that are based on types of soil along the fiber optic cable. Additionally, or alternatively, determining the distance includes determining the distance based on the normalized vibration data at three locations of the fiber optic cable that are separated by two lengths between the three locations. This may involve a two triangle method.

As further shown in FIG. 4, process 400 may include performing one or more actions based on the distance satisfying a distance threshold (block 450). For example, the device may perform one or more actions based on the distance satisfying a distance threshold, as described above. In some implementations, process 400 includes determining, by the device and based on subsequent vibration data produced by the vibration source, a movement direction of the vibration source. This may involve analyzing vibration data from two locations and a timing of the vibration data. The device may perform an action further based on the movement direction of the vibration source.

In some implementations, the one or more actions include at least one of causing an autonomous vehicle to be dispatched to a location associated with the vibration source, to verify that the vibration source is associated with excavation, causing an autonomous vehicle to be dispatched to the location to provide an alert regarding a potential for damage of the fiber optic cable, causing a technician to be dispatched to the location to provide the alert regarding the potential for damage of the fiber optic cable, or causing the fiber optic cable to be tested to verify that the fiber optic cable is properly functioning.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, etc., depending on the context.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   obtaining, by a device, responsivity data for a fiber optic cable deployed within an environment,
      wherein the responsivity data indicates differences in vibration dampening by the environment around the fiber optic cable;
   receiving, by the device and from a sensor device, vibration data associated with at least two locations along the fiber optic cable,
      wherein the vibration data is produced by a vibration source in or on the environment;
   determining, by the device and based on the responsivity data and the vibration data, respective normalized signal intensity values at the at least two locations along the fiber optic cable;
   determining, by the device and based on the respective normalized signal intensity values at the at least two locations along the fiber optic cable, a distance between the vibration source and one of the at least two locations along the fiber optic cable,
      wherein determining the distance is further based on a vibration-dampening coefficient of soil within the environment, or
      wherein:
         the at least two locations along the fiber optic cable include three locations along the fiber optic cable, and
         determining the distance is further based on a ratio involving the respective normalized signal intensity values at the three locations along the fiber optic cable; and
   performing, by the device, one or more actions associated with verifying a function of the fiber optic cable or preventing damage to the fiber optic cable based on the distance satisfying a distance threshold.

2. The method of claim 1, wherein the responsivity data includes measurements of responsivity of the fiber optic cable at segments of the fiber optic cable.

3. The method of claim 2, wherein responsivity for a first one of the segments is different than responsivity for a second one of the segments.

4. The method of claim 1, wherein determining the distance is further based on the vibration-dampening coefficient of the soil within the environment.

5. The method of claim 4, further comprising obtaining the vibration-dampening coefficient from a look-up table of vibration-dampening coefficients that are based on types of soil along the fiber optic cable.

6. The method of claim 1, wherein the at least two locations along the fiber optic cable include the three locations along the fiber optic cable, and wherein determining the distance is further based on the respective normalized signal intensity values at the three locations along the fiber optic cable.

7. The method of claim 1, further comprising:
determining, by the device and based on subsequent vibration data produced by the vibration source, a movement direction of the vibration source; and
wherein performing the one or more actions includes performing the one or more actions further based on the movement direction of the vibration source.

8. The method of claim 1, wherein the one or more actions include at least one of:
causing an autonomous vehicle to be dispatched to a location associated with the vibration source, to verify that the vibration source is associated with excavation;
causing an autonomous vehicle to be dispatched to the location associated with the vibration source to provide an alert regarding a potential for damage of the fiber optic cable;
causing a technician to be dispatched to the location associated with the vibration source to provide the alert regarding the potential for damage of the fiber optic cable; or
causing the fiber optic cable to be tested to verify that the fiber optic cable is properly functioning.

9. A device, comprising:
one or more processors configured to:
obtain responsivity data a fiber optic cable deployed within an environment,
wherein the responsivity data indicates differences in vibration dampening by the environment around the fiber optic cable;
receive, from a sensor device, vibration data associated with at least two locations along the fiber optic cable, wherein the vibration data is produced by a vibration source;
determine, based on the responsivity data and the vibration data, respective normalized values at the at least two locations along the fiber optic cable;
determine, based on respective normalized intensity values at the at least two locations along the fiber optic cable, a distance between the vibration source and one of the at least two locations along the fiber optic cable,
wherein the one or more processors, when determining the distance, are configured to determine the distance further based on a vibration-dampening coefficient of soil within the environment, or
wherein:
the at least two locations along the fiber optic cable include three locations along the fiber optic cable, and
the one or more processors, when determining the distance, are configured to determine the distance further based on a ratio involving the respective normalized intensity values at the three locations along the fiber optic cable; and
perform one or more actions associated with verifying a function of the fiber optic cable or preventing damage to the fiber optic cable based on the distance satisfying a distance threshold.

10. The device of claim 9, wherein the vibration data includes respective intensity values at the at least two locations along the fiber optic cable, and
the one or more processors, when determining the respective normalized intensity values at the at least two locations along the fiber optic cable, are configured to: increase or decrease the respective intensity values based on the responsivity data.

11. The device of claim 9, wherein the one or more processors, when obtaining the responsivity data, are further configured to:
obtain measurements of vibration responsivity at segments of the fiber optic cable; and
generate the responsivity data based on the measurements.

12. The device of claim 9, wherein the one or more processors, when obtaining the responsivity data, are further configured to:
obtain an ambient vibration level over a duration of time for segments of the fiber optic cable; and
determine the responsivity data, for each segment, based on a result of comparing the ambient vibration level of the segment with an acoustic signal measured at the segment.

13. The device of claim 9, wherein the vibration source includes construction activity.

14. The device of claim 13, wherein the construction activity includes at least one of excavation, digging, or drilling.

15. A non-transitory computer-readable medium storing instructions, the instructions comprising:
one or more instructions that, when executed by one or more processors, cause the one or more processors to:
obtain responsivity data for a fiber optic cable deployed within an environment,
wherein the responsivity data indicates differences in vibration dampening by the environment around the fiber optic cable;
receive, from a sensor device, vibration data associated with at least two locations along the fiber optic cable, wherein the vibration data is produced by a vibration source in or on the environment;
determine, based on the responsivity data and the vibration data, respective normalized intensity values at the at least two locations along the fiber optic cable;
determine, based on the respective normalized intensity values at the at least two locations along the fiber optic cable, a distance between the vibration source and the fiber optic cable,
wherein the one or more instructions, that cause the one or more processors to determine the distance, further cause the one or more processors to determine the distance further based on a vibration-dampening coefficient of soil within the environment, or
wherein:
the at least two locations along the fiber optic cable include three locations along the fiber optic cable, and
the one or more instructions, that cause the one or more processors to determine the distance, further causes the one or more processors to determine the distance further based on a ratio involving the respective normalized intensity values at the three locations along the fiber optic cable; and
perform one or more actions associated with verifying a function of the fiber optic cable or preventing damage to the fiber optic cable based on the distance satisfying a distance threshold.

16. The non-transitory computer-readable medium of claim 15, wherein the one or more instructions further cause the one or more processors to:

determine, based on subsequent vibration data produced by the vibration source, a movement direction of the vibration source; and perform the one or more actions further based on the movement direction of the vibration source.

17. The non-transitory computer-readable medium of claim 15, wherein the one or more instructions, that cause the one or more processors to determine the distance, further cause the one or more processors to determine the distance further based on the vibration-dampening coefficient of soil within the environment and a length of the fiber optic cable between the at least two locations along the fiber optic cable.

18. The non-transitory computer-readable medium of claim 15, wherein the one or more instructions, that cause the one or more processors to determine the distance, further cause the one or more processors to determine the distance further based on the vibration-dampening coefficient of soil within the environment.

19. The non-transitory computer-readable medium of claim 15, wherein the one or more instructions further cause the one or more processors to determine that the vibration source is a threat to the fiber optic cable based on a deviation, of an intensity level of the vibration data from an ambient vibration level, satisfying a vibration deviation threshold.

20. The non-transitory computer-readable medium of claim 15, wherein the one or more instructions, that cause the one or more processors to determine the distance, further cause the one or more processors to determine the distance further based on the ratio involving the respective normalized intensity values at the three locations along the fiber optic cable.

* * * * *